US007886959B2

(12) United States Patent
Thompson et al.

(10) Patent No.: US 7,886,959 B2
(45) Date of Patent: Feb. 15, 2011

(54) SECURITY MONITORING SYSTEM FOR A BULK FOODSTUFF TRANSPORT CONTAINER

(75) Inventors: Christopher Dwight Thompson, Lexington, KY (US); Suraj M. Alexander, Anchorage, KY (US); William L. Crist, Lexington, KY (US); Brian D. Luck, Hanson, KY (US); James Ryan Moore, Beaver Dam, KY (US); Jonathan C Paschal, Alvaton, KY (US); Frederick Alan Payne, Lexington, KY (US); Timothy S Stombaugh, Nicholasville, KY (US); Nasrin Tabayehnejad, Lexington, KY (US); Phillip C Womble, White House, TN (US)

(73) Assignees: Western Kentucky University, Bowling Green, KY (US); University of Louisville Research Foundation, Inc., Louisville, KY (US); University of Kentucky Research Foundation, Lexington, KY (US)

( * ) Notice: Subject to any disclaimer, the term of this patent is extended or adjusted under 35 U.S.C. 154(b) by 497 days.

(21) Appl. No.: 12/051,181

(22) Filed: Mar. 19, 2008

(65) Prior Publication Data
US 2008/0230606 A1 Sep. 25, 2008

Related U.S. Application Data

(60) Provisional application No. 60/918,798, filed on Mar. 19, 2007.

(51) Int. Cl.
G06F 7/00 (2006.01)
(52) U.S. Cl. .................. 235/376; 235/375; 235/385

(58) Field of Classification Search ............ 235/375, 235/376, 384, 385, 435
See application file for complete search history.

(56) References Cited

U.S. PATENT DOCUMENTS

| 4,455,483 A | 6/1984 | Schonhuber |
| 5,892,441 A | 4/1999 | Woolley et al. |
| 6,006,615 A | 12/1999 | Uttinger |

(Continued)

OTHER PUBLICATIONS

Presentation given to International Milk Haulers Association, Branson, MO, Apr. 24, 2006.

(Continued)

Primary Examiner—Thien M. Le
Assistant Examiner—Christle I Marshall
(74) Attorney, Agent, or Firm—King & Schickli, PLLC

(57) ABSTRACT

A security monitoring system provides for the secure transport of a bulk foodstuff container. The system includes an electromechanical locking mechanism allowing access by only authorized persons, a positional locator for determining the geographical position of the bulk foodstuff transport container, and a controller associated with the transport container. The controller controls operation of the electromechanical locking mechanism, stores data received from the electromechanical locking mechanism and the positional locator, and communicates with a remote data processor in near real time. A handheld user interface device is configured to control operation of the controller, to process and store data received from the controller, and to communicate with the remote data processor. Unique identifiers are provided for the bulk foodstuff transport container, the transport vehicle, any storage container from which or into which a bulk foodstuff is transferred, and any authorized operator of the security monitoring system.

9 Claims, 4 Drawing Sheets

U.S. PATENT DOCUMENTS

| | | | |
|---|---|---|---|
| 6,070,793 A * | 6/2000 | Reichl et al. | 235/375 |
| 6,496,775 B2 | 12/2002 | McDonald, Jr. et al. | |
| 6,874,000 B2 | 3/2005 | Sholl et al. | |
| 7,009,517 B2 | 3/2006 | Wood | |
| 7,036,981 B2 | 5/2006 | Veenstra et al. | |
| 7,062,513 B2 | 6/2006 | Beck et al. | |
| 7,085,777 B2 | 8/2006 | Beck et al. | |
| 7,149,658 B2 | 12/2006 | Kadaba | |
| 7,183,923 B2 | 2/2007 | Sasaki et al. | |
| 7,271,719 B2 | 9/2007 | Ku et al. | |
| 7,728,711 B2 * | 6/2010 | Shoenfeld | 340/5.73 |
| 2005/0110635 A1 * | 5/2005 | Giermanski et al. | 340/539.22 |

OTHER PUBLICATIONS

Presentation given at Dairy.comDean Foods Meeting, Dallas, TX, Dec. 7, 2006.

Presentation given at FDA Central Region Milk Seminar, Wheeling, WV, Oct. 18, 2005.

* cited by examiner

SECURITY MONITORING SYSTEM FOR A BULK FOODSTUFF TRANSPORT CONTAINER

This application claims the benefit of priority in U.S. Provisional Patent Application Ser. No. 60/918,798, filed on Mar. 19, 2007, the entirety of which is incorporated herein by reference.

This invention was made with Government support from the Department of Homeland Security through the National Institute for Hometown Security, Eastern Kentucky University contract number EKU 06-194, 2004-IJ-CX-K055. The Government may have certain rights in the invention.

TECHNICAL FIELD

The present disclosure relates generally to preserving security of foodstuffs. More particularly, the disclosure relates to methods and systems for preserving security of bulk foodstuffs during transport, to prevent unauthorized access, adulteration, and the like.

BACKGROUND OF THE INVENTION

Minimal securing safeguards exist for transport of bulk foodstuffs such as milk, orange juice, liquid sugar, eggs, grains, and the like. Indeed, conventional methods for securing bulk foodstuffs during transport are highly paper-intensive and prone to error. It is recognized in the transport sector that a need exists for methods and systems for securing bulk foods during transport which both reduce recording errors and enable normal transport activities to proceed, while at the same time providing security against unauthorized access to such bulk foodstuffs.

Large batch size, rapid turnaround at retail, rapid consumption, thorough mixing of multiple batches from multiple sources during processing, and high accessibility at various stages of transport are all hallmarks of a high-risk food items, which typically must be transported in bulk. Loaded and unloaded transport vehicles for bulk foodstuffs are routinely left unattended and may be left in unsecured and/or unsupervised areas. Many of these unsecured and unsupervised areas, such as for example farms, remote transfer points, hauling company property, and vehicle driver residences, are secluded and easily accessible to individuals having malicious intent. Even more, the combination of multiple sources, batch mixing, the requirement for bulk transport, and the nature of the foodstuff itself often prevent individual item or batch labeling and/or tracking of particular items or batches of foodstuffs for security purposes.

Using the dairy industry as an example, security measures employed by bulk transporters such as milk transportation companies typically comprise voluntary seal programs including use of plastic, numbered seals applied to milk transport tank openings. Often, such seals are not tamper-evident, that is, the seals may be tampered with (to access the contents being transported) in a manner that would not be easily discovered. In such conventional systems, seal number identifiers are recorded by hand as they are applied to the transport tank openings, which raise one potential situation for introduction of error. As seals are broken during routine transportation activities, seal numbers are accumulated. Some transportation companies require that broken seals be maintained. However, such systems provide yet additional opportunities for introduction of error, in that the human element is prone to record keeping errors. In addition, maintaining broken seals is burdensome and time-consuming, since it is common to have numerous broken seals for a single bulk load of milk.

Even more, conventional record keeping practices in the dairy industry provide for handwritten bulk milk records. The level of detail associated with records kept with each load of milk is inconsistent and prone to inaccuracy, again due to the human element. Proper records maintenance is critical to allow adequate trace-back of milk in the event of adulteration or potential adulteration. Conventional practice at the producer (dairy farm) level is to maintain handwritten records, commonly referred to as a "barn ticket." Pertinent information relating to each producer is maintained within these records. As is the case for recordkeeping when using numbered seals, such "barn ticket" records are error-prone. For example, due to the environment in which such "barn tickets" are kept and inconsistencies from one records-keeper to the next, legibility is often a concern. Recording errors, mathematical errors, and loss of entire portions of particular records are commonplace.

There has accordingly been identified a need in the art for an effective security monitoring system for use in foodstuff transport, particularly a system applicable to bulk foodstuff transport. The system should be efficient, effective, and applicable to the strictures of existing networks and trade channels established by foodstuff producers, transporters, and processors.

SUMMARY OF THE INVENTION

In accordance with the foregoing need identified in the art as described herein, security monitoring methods and systems for implementation in bulk foodstuff transport operations are provided. The methods and systems comprise electromechanical and communications aspects assuring secure transport of bulk foodstuffs, foodstuff samples, foodstuff data, and security data between locations, such as farms, transfer stations, receiving stations, and processors. The methods and systems comprise a number of subsystems working cooperatively to assure secure transport of foodstuffs. The methods and systems further comprise data storage capacities for receiving a variety of information relating to the foodstuffs being transported, and also to the producer. Advantageously, the methods and systems are designed to operate automatically, requiring minimal to no input or attention by the transporter who may be completely unassociated with either the producer or with the endpoint processor of the foodstuff. The methods and systems may be incorporated substantially seamlessly into existing foodstuff transport infrastructures, and are applicable to transport of foodstuffs domestically and internationally.

In one aspect, there is set forth herein a security monitoring system for a bulk foodstuff transport container, including an electromechanical locking system for securing one or more access ports or doors of the transport container, a monitoring sensor arrangement for monitoring a status of the electromechanical locking mechanism, and a controller associated with the bulk foodstuff transport container. The controller includes a suitable user interface, is configured to control operation of the electromechanical locking system, and is configured also to process and store data received from the electromechanical locking system and the monitoring sensor arrangement. Optionally, communication to a remote data server directly from the controller may be included in the security monitoring system.

The security monitoring system further includes a positional locator for monitoring a geographical position of the bulk foodstuff transport container, and one or more temperature sensors for monitoring a temperature of an interior of the bulk foodstuff transport container and of a foodstuff held therein. Unique identifiers, such as bar code identifiers, may be assigned to one or more of the bulk foodstuff container, to the transport vehicle, to any storage container from which a bulk foodstuff is transferred into the bulk foodstuff transport container, and to any storage container into which a bulk foodstuff is transferred from the bulk foodstuff transport container. A handheld user interface device may be provided for controlling operations of the controller, for processing and storing data received from the controller, for reading the unique identifiers, and for communicating with a remote data processor.

In another aspect, a method is set forth for monitoring and securing a bulk foodstuff during a transport operation, for use with a bulk foodstuff transport container including an electromechanical locking system as set forth above. The method includes assigning a unique identifier to the bulk foodstuff transport container, to any storage container from which a bulk foodstuff is transferred to the bulk foodstuff transport container, to any storage container into which a bulk foodstuff is transferred from the bulk foodstuff transport container, and to any individual authorized to access an interior of the bulk foodstuff transport container. The method further includes automatically recording any status change in the electromechanical locking system, requiring inputting of a unique identifier and a reason prior to allowing such a status change to be made even by an authorized individual, and also automatically recording a geographical position of the bulk foodstuff transport container at predetermined intervals. A controller as set forth above may be utilized to record and store such unique identifiers, status changes, and geographical locations at predetermined intervals.

The method further contemplates providing a handheld user interface device for controlling operations of the controller such as the status of the electromechanical locking system, for retrieving and storing data stored by the controller, and for reading the unique identifiers as set forth above. The handheld user interface device is further configured for transferring those data to a remote data processor.

In the following description there are shown and described several different embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiments of the invention, examples of which are illustrated in the accompanying drawings.

DETAILED DESCRIPTION OF THE INVENTION

In accordance with the foregoing need identified in the art as described herein, a security monitoring method and system for implementation in bulk foodstuff transport is provided. The method and system comprises electromechanical and communications aspects assuring secure transport of bulk foodstuffs, foodstuff samples, foodstuff data, and security data between locations such as producers, transfer stations, receiving stations, and processors. The method and system comprise a number of subsystems working cooperatively to assure secure transport of foodstuffs. The method and system further comprise data storage capacities for receiving a variety of information relating to the foodstuffs being transported, and also to the producer. Advantageously, the method and system are designed to operate automatically, requiring minimal to no input or attention by the transporter who may be completely unassociated with either the producer or with the endpoint processor of the foodstuff. The method and system may be incorporated substantially seamlessly into existing foodstuff transport infrastructures, and are applicable to transport of foodstuffs domestically and internationally.

In one aspect, a security monitoring system 10 for a bulk foodstuff container is provided. Certain embodiments of the invention are directed to transport of a bulk liquid, and many of the examples set forth herein are directed to applicability of the invention to transport of bulk liquids. However, the skilled artisan will readily appreciate the applicability of the invention to transport of any bulk foodstuff, liquid or otherwise, including without limitation milk, grains, orange juice, frozen orange juice concentrate, liquid sugars, eggs, and the like. Even more, the depicted embodiments set forth herein for purposes of demonstration and example show a particular transport system for bulk milk, being a transport container or tanker hauled by a truck. However, the skilled artisan will again readily appreciate the applicability of the system to any transport infrastructure providing for a lockable container and a vehicle to transport it, such as a freight train hauling a lockable railroad car or lockable container placed on a flatbed railroad car, a lockable container transported by airplane, a lockable container transported by ship, and the like.

Figure 1:
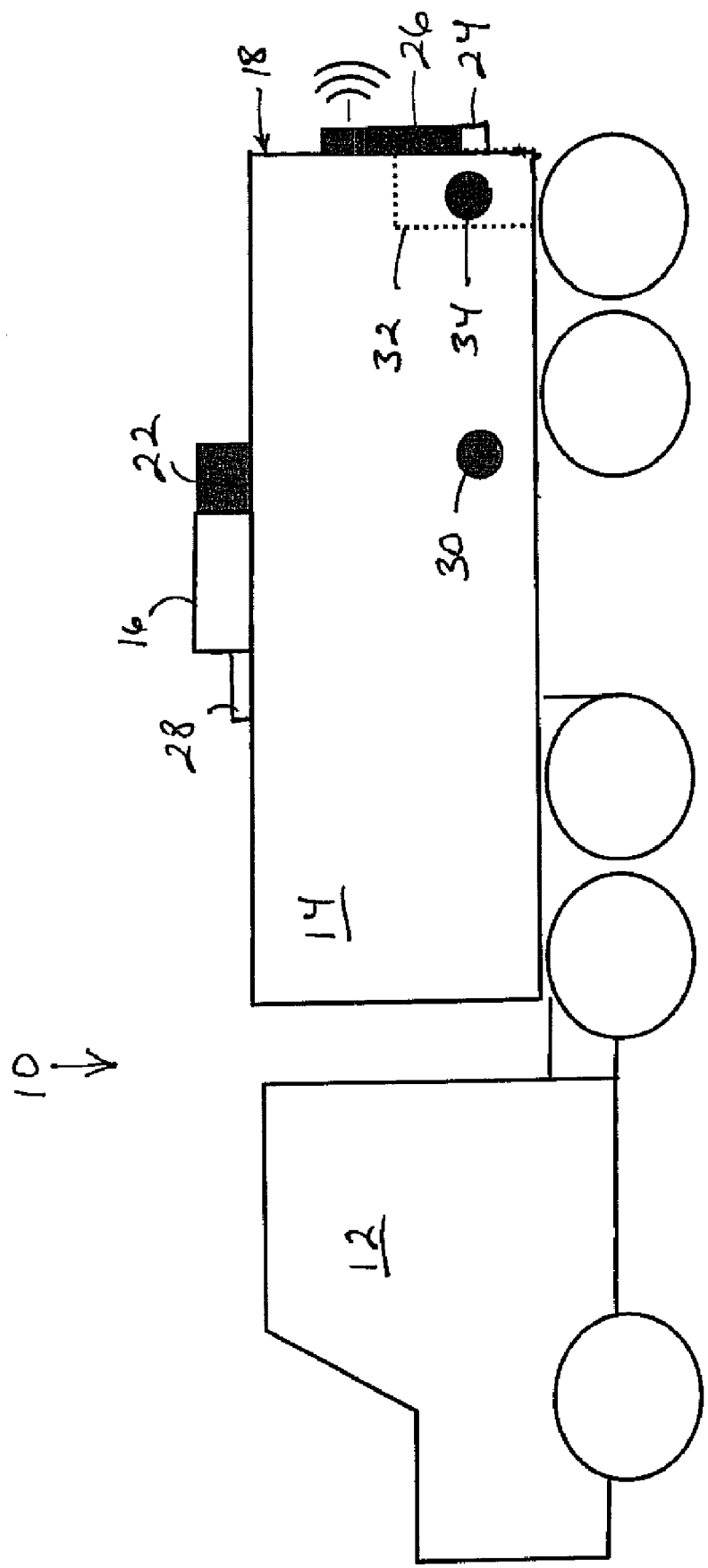
FIG. 1 schematically depicts a security monitoring system for transport of bulk foodstuffs.

An embodiment of the security monitoring system 10 is illustrated in FIG. 1. That Figure shows a transport vehicle 12 for transporting milk, that is, a substantially conventional tractor-trailer, and a transport tanker or container 14. The transport container 14 includes a top-mounted access port or hatch 16, and also a rear door 18. An electromechanical locking mechanism 20 is provided also. As depicted, the electromechanical locking mechanism 20 consists of a first electromechanical lock and sensor 22 for controlling access to top mounted port 16 and a second electromechanical lock and sensor 24 for controlling access to rear door 18.

A controller 26 is provided on the transport container 14, configured to control operation of the first and second electromechanical lock and sensors 22, 74. The controller 26 includes a user interface such as a keypad (not shown for convenience), and also is configured to process and store data received from the electromechanical locking mechanism 20. The user interface is designed to withstand harsh environmental conditions, rough jolts encountered during transport, etc. Still further, the controller 26 may optionally be configured for wireless communication of stored data to a remote data processor (discussed below), for example by cellular communication, wi-fi communication via the Internet, or similar modes.

The first and second electromechanical locks and sensors 22, 24 maintain security by maintaining top-mounted port 16 and rear door 18 in a locked configuration unless requested by an authorized individual. Further, the first and second electromechanical locks and sensors 22, 24 receive and store data regarding the lock status (that is, locked or unlocked) and the top-mounted port 16 and rear door 18 status (that is, open or closed). Upon receiving instructions from an authorized individual, that is, an individual possessing a proper input code or instruction, the controller 24 will emit a signal to unlock one or both of the first and second electromechanical locks and sensors 22, 24. A manual emergency release mechanism (not shown) is provided for top-mounted port 16 and rear door 18 also in the event of emergency. It will be appreciated that the controller 26 may communicate with the components of the electromechanical locking mechanism 20 by any suitable means, such as by cabling or wiring routed in an interior of the transport container 14, by wireless means such as cellular communication, infrared signals, RF communication, and the like.

Another important feature of the security monitoring system 10 is a positional locator 28 on the transport container 14, in the depicted embodiment being a global positioning satellite (GPS) receiver. Of course, alternative positional locators 28 are contemplated, such as radio positioning systems, wi-fi positioning systems, and the like. The positional locator 28 transmits at least longitudinal and latitudinal coordinates for the transport container 14 prior to, during, and after a transport operation, and further provides a real-time clock for the security monitoring system 10. Any suitable transmission protocol may be utilized, such as without limitation a Controller Area Network (CAN) communications protocol, serial data transmission, wireless protocols, and the like.

For applications where a temperature-sensitive foodstuff is transported, the transport container 14 may be provided with a first temperature sensor 30. In the depicted embodiment, the first temperature sensor 30 is mounted on the transport container 14 to measure an inner temperature thereof. It will be appreciated that the first temperature sensor 30 is intended to monitor a temperature of a foodstuff (not shown) held in an interior of the transport container 14, and also to monitor temperature of a variety of temperature-sensitive processes such as washing and sanitizing of the transport container 14 interior, and the like.

In foodstuff transport operations for foodstuffs such as milk, it is known to provide a sampling container 32 in transport container 14, which in the embodiment shown in FIG. 1 may be accessed through rear door 18. The purpose of such a sampling container 32 is to allow storage of a portion of the foodstuff being transported, for sampling purposes, without direct contact with the contents of the transport container 14. For example, it is desirable to analyze samples of milk being transported in a bulk transport container 14 for a variety of quality control parameters, such as for example somatic cell count (SCC), antibiotic contamination, fat content, and the like. To allow proper sampling, it is often necessary to regulate a temperature of a sample contained in the sampling container 32. For that reason, a second temperature sensor 34 may be provided for monitoring a temperature of the contents of the sampling container 32.

In the depicted embodiments, thermistors of substantially conventional design are employed as first and second temperature sensors 30, 34. Even more, sensors for detecting and/or measuring other analytes may be provided, such as for detecting/measuring oxygen, carbon dioxide, pH, biological agents, or the like.

It will be appreciated that the data processing and storage functions, as well as the ability of the various components of the security monitoring system 10 to communicate one with the other, are critical. For that reason, the security monitoring system 10 includes multiple embedded processors dedicated to security monitoring and data storage. For convenience, the referenced processors are not enumerated separately from the components of the security monitoring system 10.

A primary processor incorporated into the controller 26 communicates with and stores data retrieved from a variety of secondary processors, including at least secondary processors associated with the top-mounted port 16, the first and second electromechanical locks and sensors 22, 24, the first temperature sensor 30 and second temperature sensor 34 (when included in the system 10), and the positional locator 28. The primary processor records data such as security-related data at predetermined intervals (for example, 1 minute intervals), and also upon occurrence of specified events, such as authorized unlocking or an unauthorized attempt to access a component of the electromechanical locking mechanism 20, geographical position of the transport container 14, and the like.

The primary processor is configured to organize such data and store it directly in non-volatile memory, such as secure digital memory cards, flash memory, electrically erasable programmable read-only memory, and the like. For security purposes, sufficient memory is provided to store a number of security session data files representative of a predetermined time period, such as a day, seven days, thirty days, etc. Of course, the predetermined time period will be dictated by any number of factors, including convenience, existing transport infrastructure, and the like. For example, in one embodiment the security monitoring system includes sufficient data storage capacity to process and store security and milk data accumulated over a time period of 60 days. The security session data file will consist of a variety of input data files, such as information relating to the source of the foodstuff and the quality of the foodstuff (in the example of a milk truck, the farm or farms from which the milk was pooled, quality control information relating to each batch of milk from each farm, etc.) and security data collected during transport (geographical positioning of the transport container 14, information relating to locking/unlocking of the electromechanical locking mechanism 20 and the identity of the individual doing so, etc.).

A feature of the security monitoring system 10 will readily become apparent. Specifically, the information comprising a security session data file is stored by the primary processor, and remains with the transport container 14. This is in contrast to conventional security systems employed during transport of foodstuffs, which often cannot provide consistent security/positional information as described herein in the event that the transport container 14 becomes separated from the transport vehicle 12.

The organized, stored data is accessible wirelessly or alternatively via a non-wireless communications interface of known design, such as RS-232, USB, etc. Commands may be input directly to the primary processor via a user interface on controller 26, or via a separate handheld user interface device (discussed in detail below). The primary processor includes multiple data send and receive capabilities, such as the CAN bus communication, to send and receive data internal to the security monitoring system such as status reports, lock/unlock commands, and the like. The primary processor also typically includes wireless communication capabilities for sending and receiving data from a variety of external sources as will be discussed below.

Typically, the secondary processors communicate with the primary processor via conventional means. For example, in the depicted embodiment of FIG. 1 communication is via CAN bus communication through cable wiring, although wireless communication such as by cellular communication, infrared signals, RF communication, and the like is contemplated also. The secondary processors execute commands received from the primary processor, as well as continuously monitoring the various sensors described above and providing those data to the primary processor.

As discussed above, commands may be input to the controller 26 via a user interface located on the transport container 14. A handheld user interface device 36 (see FIG. 2) is provided also for inputting commands, for transferring data from the primary processor, and for communicating with a remote data processor (discussed in detail below). A number of such devices are known having the required data processing and data transmitting/receiving capabilities, such as laptop computers, handheld computers, so-called "smart phones," etc. The depicted remote user interface device 36 is capable of a variety of communication modes, including wireless modes (BLUETOOTH®, wireless or wi-fi, conventional cellular telephone transmissions, and the like), and also includes a keypad for manual entries, telephone dialing operations, etc.

Figure 2:
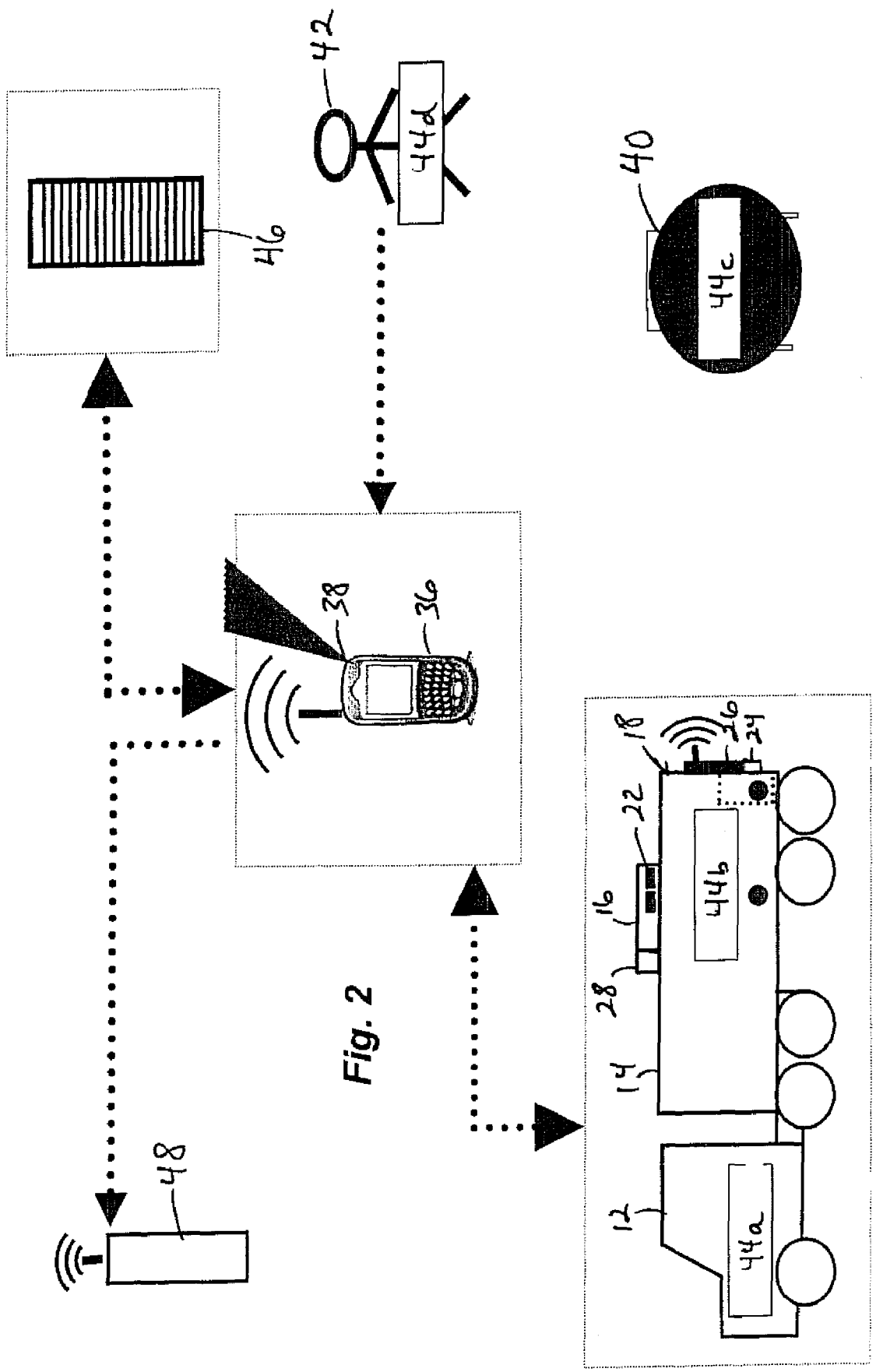
FIG. 2 illustrates additional aspects of the security monitoring system shown in FIG. 1.

The handheld user interface device 36 will typically be used for inputting commands to the primary processor, rather than the controller 26 user interface, for convenience. As schematically depicted in FIG. 2, the handheld user interface device 36 may transmit commands and receive data wirelessly (such as via wi-fi communications) to and from the controller 26. In addition, the handheld user interface device 36 may communicate wirelessly with other devices. For example, as shown in FIG. 2, the handheld user interface device may transmit particular data representative of a foodstuff cargo to an ancillary device, such as a portable printer 48 of known design. In the dairy industry, this feature is of value in printing milk sample labels, barn tickets, bulk milk load tickets, and the like, which may be used to record information but are also useful and necessary in determining proper payment to the producer.

Further, the handheld user interface device 36 includes a suitable reader or scanner 38 capable of reading or scanning unique identifiers from a variety of sources. Again using the dairy industry as an example and again referring to FIG. 2, milk from a particular farm will typically be stored in a bulk tank 40 while awaiting pick-up. A transport vehicle 12 operated by an authorized transport vehicle operator 42 will travel from farm to farm, collecting mil from the farm bulk milk tank or tanks in the transport container 14. Each of the transport vehicle 12, transport container 14, bulk tank 40, and vehicle operator 42, and other features or authorized users of the security monitoring system 10, may be assigned a unique identifier 44a, 44b, 44c, etc., respectively.

A convenient and well-known method for assigning a unique identifier 44 comprises using bar codes, that is, assigning an individual bar code incorporating desired information to each of the above-listed features. The handheld user interface device 36 is provided with a bar code reader 38 of a type well-known in the art, which scans or reads the bar code placed on the transport vehicle 12, the transport container 14, the bulk tank 40, and an identification badge, official documentation, or the like carried by the transport vehicle operator 42. Each of these unique identifiers 44 (bar codes) are read into memory by the handheld user interface device 36. In this fashion, for each load of milk, the specific transport vehicle 12, transport container 14, bulk tank 40 from which the milk was transferred, and vehicle operator 42 are immediately ascertained, associated, recorded, and stored in memory.

Still yet further, one or both of the controller 26 and the handheld user interface device 36 are configured to communicate with a remote data processor 46, such as by cellular telephone communication, transmission of data over the Internet, and the like. The value of this feature is immediately apparent, in that all data processed and stored by the controller 26 primary processor are transferred directly or via the handheld user interface device 36 to the remote data processor 46 located at a remote data processing and storage facility. In addition to the redundant data backup and storage feature provided thereby, it is possible to store all data associated with the security monitoring system 10 at one or more central facilities, such as for example at the foodstuff processing plant to which the foodstuff is delivered, for further processing and monitoring for security and non-security purposes.

Figure 3:
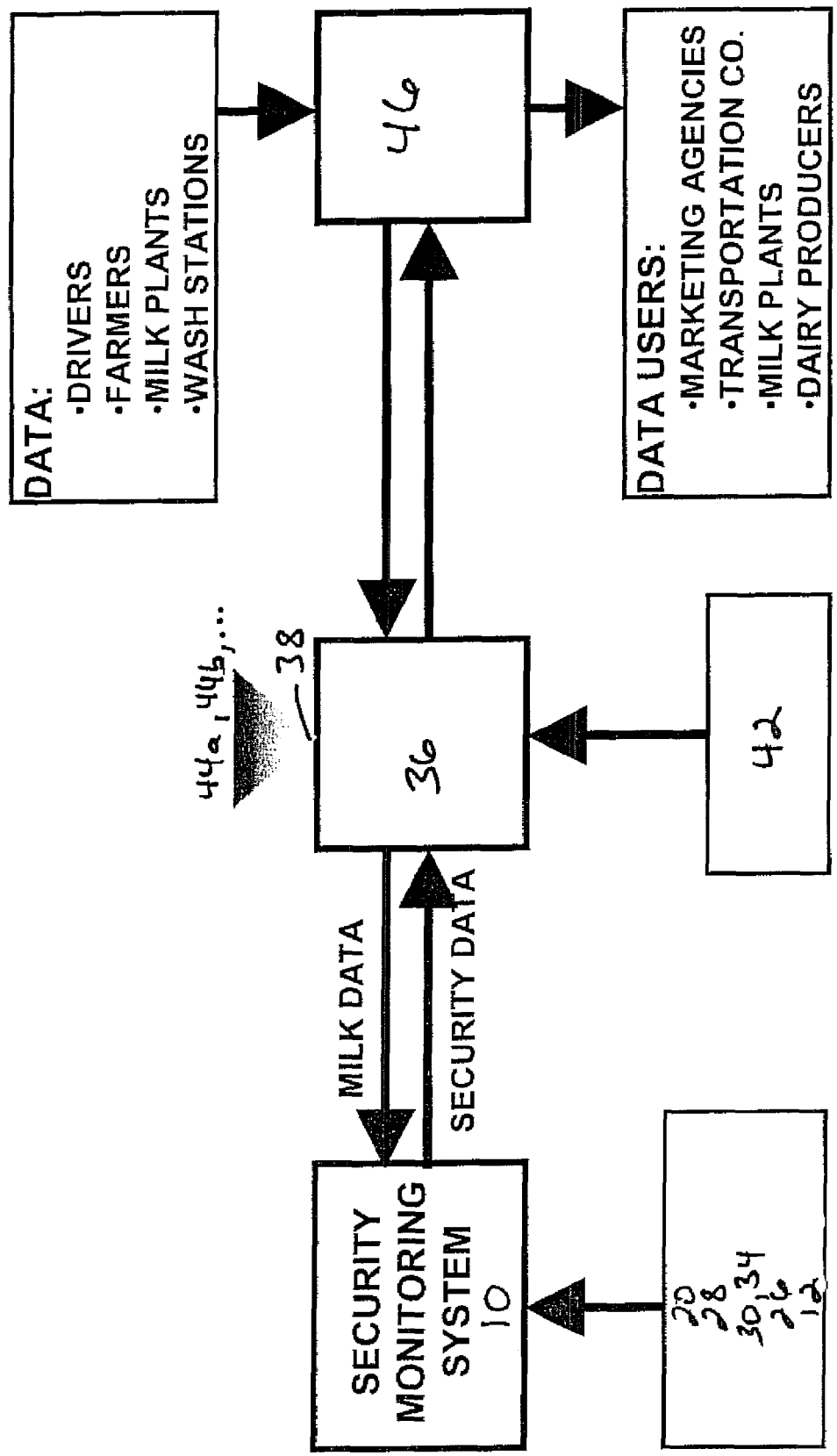
FIG. 3 schematically shows communications between various aspects of the security monitoring system.

This relationship is depicted schematically in FIG. 3, again using the dairy industry as an example. With reference to that Figure, the handheld user interface device 36 receives data relating at least to the status of the electromechanical locking system 10, the positional locator 28, and the first and second temperature sensors 30, 34. The handheld user interface device 36 further receives data relating to the identity of the transport vehicle 12, the operator 42, the identity of any individual accessing rear door 18 for purposes of removing a milk sample from or adding a milk sample to sampling container 32, etc. These data are transmitted to the remote data processor 46 for processing and storage as described below, typically in near real time fashion to allow more effective monitoring for security purposes.

Figure 4:
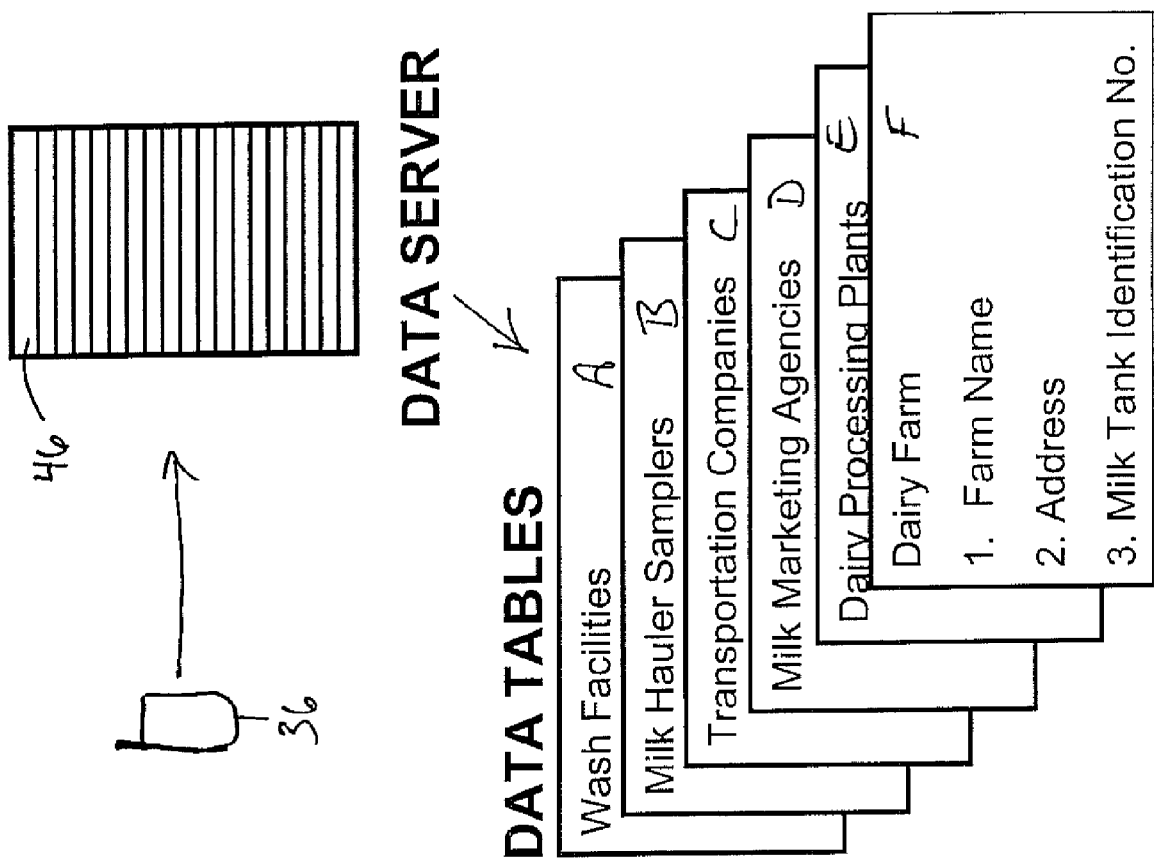
FIG. 4 illustrates a representative data analysis format at a remote data processing facility according to the security monitoring system.

With reference to FIG. 4, the remote data processor 46 may be one or more data servers located at one or more central facilities, such as in the case of the dairy industry the milk plant. All data relating to the particular foodstuff and to the security monitoring system 10 are transferred to the remote data processor 46 from the handheld user interface device 36 at predetermined intervals. In the depicted embodiment, the foodstuff is bulk milk. The remote data processor organizes the transmitted data into a series of data tables, in the depicted embodiment being tables A, B, C, D, E, F, containing data relating to the transport container 14, to the wash facility, to the particular transportation company transporting the milk, to the particular dairy processing plant or plants to which the milk load is delivered, and to the particular dairy farm or farms from which the load contained in the transport container 14 was obtained. Such data can be made accessible to not only to entities concerned with food safety, but also to marketing agencies, transport companies, foodstuff processing plants, and to the foodstuff producers themselves.

EXAMPLE

The following example is provided to illustrate the capabilities of the present security monitoring system as described above, using transport of milk in bulk quantities from producer to milk processing plant for illustrative purposes. Those of skill in the art will realize, however, that the system is equally applicable to transport of foodstuffs in other areas as discussed above.

The security monitoring system 10 as described above comprises an electromechanical and communication system which, when applied to the dairy industry, assures the secure transport of bulk milk, milk samples (representative samples taken from a farm bulk milk tank which are analyzed to determine milk composition and/or quality), milk data (data collected by the transporter relating to the farm from which the milk is obtained) and security data (data collected by the security monitoring system as described above) between locations and specifically between dairy farms, transfer stations (that is, locations where milk is transferred from one transport container 14 to another, typically to commingle smaller milk loads for more efficient transportation), receiving stations (any area where raw milk is received, collected, handled, or stored) and milk plants (premises where milk is received, collected, handled, stored, and processed for further sale, typically including a receiving station and a wash station for washing/sanitizing the transport container 14 interior after transport of a load of milk).

In a typical embodiment, the security monitoring system 10 includes the features described above (see also FIG. 1) installed on the transport container 14, a handheld user interface device 36, an optional printer 48, and a remote data processor 46. These subsystems work together to assure the secure transport of milk.

The present security monitoring system 10 accommodates various requirements such as: allowing collection of producer information (for example, herd data such as size, health information, etc. of a particular dairy herd); assimilating easily into existing bulk milk transport infrastructure; operating equally well with electronically instrumented and non-instrumented producers (dairy farms) and non-instrumented milk receiving stations; operating for dairy farms that direct-load a milk transport container 14 (milk tank) rather than using a commercial transporter; operating for multiple dairy record keeping systems; providing versatility to allow the bulk milk hauler/sampler (an individual trained to collect official milk samples, measures, and weights of milk at a dairy farm, and to deliver bulk milk to a milk plant) to perform routine activities if any part of the milk security monitoring system 10 malfunctions; and maintaining security in the event of a system failure (power loss, mechanical, electrical, software malfunction).

Secure transport requires also that both the personnel operating the transport equipment and the transport equipment be identified. Using the present system, the bulk milk hauler/sampler is identified using a unique identifier 44. One example of such a unique identifier is a user identification number, with this number printed in barcode for attachment to the individual's state issued documents, milk transportation company identification, or of other media as appropriate. The barcode is read by the handheld user interface device 36 at least at the beginning of a security session or whenever responsibility for the load is transferred to another approved person. The bulk milk hauler/sampler's user identification number is verified to be on the approved list of bulk milk hauler/samplers. Each bulk milk hauler/sampler is provided a unique identifier, for example one or both of a password or personal identification number (PIN) code, which must be entered to complete the driver identification process. Thus, the identification of the bulk milk hauler/sampler requires three items: the handheld user interface device 36, a unique identifier 44 for the bulk milk hauler/sample (for example, a barcode), and individualized identifier.

If an individual operating the transport vehicle 12 does not have a handheld user interface device 36, then access to the transport container 14 requires entering a PIN code and a tank access code (TAC) number. The TAC number must be obtained from an authorized person with computer access to the database at the milk transportation company.

During a security session the bulk milk hauler/sampler must enter the unique identifier into the handheld user interface device 36 to gain access to the transport container 14. A positive identification of the bulk milk hauler/sampler (signature, license check, or the like) at the transfer station or dairy plant may optionally be implemented to complement the bulk milk hauler/sampler identification process described above. The above identity checks are considered acceptable verification that all bulk milk hauler/samplers were approved throughout the security session and that the bulk milk hauler/sampler was positively identified. Optionally the bulk milk hauler/samplers may be automatically or randomly be required to reenter his/her unique identifier, such as a password, during a security session. It is common in the dairy industry for transport vehicle 12 operators to be employed who are not trained bulk milk hauler/samplers. Truck drivers not trained as bulk milk hauler/samplers must be given a PIN code by their employer. A truck driver that utilizes the handheld user interface device 36 is identified with an auto-generated user identification number. Accordingly, any individual operating the transport vehicle 12 is identified during a particular security session/transport operation, and can be tracked and traced back.

The transport vehicle 12 is identified with the handheld user interface device 36 by reading the truck identification number (such as the vehicle identification number or VIN, or the milk transport companies' assigned truck number) printed as a unique identifier such as a barcode on the transport vehicle 12. Similarly, the transport container 14 is identified with the handheld user interface device 36 by reading a unique identifier 44 such as a barcode attached at a convenient location on the transport container 14. Accordingly, any transport vehicle 12 transport container 14 utilized during a particular security session/transport operation is identified and can be tracked and traced back, whether the same combination of transport vehicle 12/transport container 14 is used during the entire transport operation or not.

Unique identifiers, such as for example barcodes, are assigned to one or both of a dairy farm and a farm bulk tank located on or near the farm. The farm bulk tank identification number is read from a barcode placed preferably on each farm bulk tank for convenient scanning by the handheld user interface device 36. The dairy farm identification number and the state issued farm identification number may be conveniently associated with the farm bulk tank identification number. Thus, the source of any and all milk batches forming a portion of a particular load or loads is identified and can be tracked and traced back.

As described above, the security monitoring system 10 described herein includes an electromechanical locking mechanism 20 for locking any access ports or doors contained on a particular transport container 14. The electromechanical locks forming the electromechanical locking mechanism 20 record lock status (locked/unlocked) and position of the access port or door (open/closed). The status and position of each lock/port or door is recorded at predetermined intervals, such as at one minute intervals, and also whenever that status/position is altered. Thus, locking and verification of lock and access port/door position is automatically monitored and recorded without operator input. The electromechanical locking mechanism 20 is configured whereby the locks remain in the locked position in the event of catastrophic system failure (power failure, electronic failure, lock failure, computer failure, etc), assuring that unauthorized access to the contents of the transport container 14 is prevented in such an event.

As a contingency in the event of such a system failure, the locks forming the electromechanical locking mechanism 20 may be manually released using a mechanical emergency release. However, to prevent use of the manual release with malicious intent, the emergency release mechanism is not field-repairable. That is, manually opening the electromechanical locking mechanism 20 will be obvious upon inspection and the transport tank will not be useable until repaired by authorized service personnel. This feature prevents individuals with malicious intent from bypassing the safeguards associated with the security monitoring system 10 by disabling the security monitoring system 10, manually opening the electromechanical locking mechanism 20, tampering with or adulterating the contents of the transport container 14, and re-locking the transport container 14 without detection.

Yet another safety feature of the present security monitoring system 10 is the requirement for providing a reason for accessing the transport container 14. A bulk milk hauler/sampler who has successfully logged into a handheld user interface device 36 can enter a password as described above, and also a reason code to specify why the transport container 14 is being accessed (for example, individual codes may be assigned to reflect access to transport container 14 for filling, for emptying, for washing/sanitizing, etc.). On the other hand, if the vehicle operator is not a bulk milk hauler/sampler, or alternatively if the handheld user interface device is lost or damaged, accessing the transport container 14 may be achieved using the controller 26 user interface. For such access, the operator must enter a PIN code and a TAC number as described above, followed by entry of an acceptable reason code. The TAC number may be kept in memory in the security monitoring system 10 controller 26 primary processor, and may be periodically changed to provide yet another safety feature. This ensures that only authorized individuals access the transport container 14.

Thus, individual unique identifiers and reason codes may be assigned and entered either via the handheld user interface device 36 or the controller 26 user interface to specify that a milk load is being added to the transport container 14, that milk is being transferred from the transport container 14 to a holding tank at a milk plant, that the bulk milk hauler/sampler is accessing only the rear door 18 to remove or add a milk sample, etc, all by an authorized individual. The advantage of this safety feature is readily apparent. There is no need to unlock every opening when the bulk milk hauler/sampler needs access to only one port. The handheld user interface device 36 wirelessly communicates signals to the security monitoring system 10 controller 26 primary processor (or alternatively the controller 26 user interface is used) for activation only of the locks required to gain access to the portion of the transport container 14 necessary to accomplish the desired task in accordance with the particular reason code input. Thus, an individual authorized or needing only to add a milk sample to or withdraw a milk sample from the sampling container 32 for subsequent analysis, but not authorized or needing to access the transport container 14 top-mounted port 16 itself, is provided only the necessary codes to open the transport container 14 rear door 18 to access the sampling container 32.

As described above, each transport container 14 is provided with a positional locator 28, such as a GPS receiver. The GPS receiver is polled by the controller 26 at predetermined intervals, such as at one minute intervals, and the data received are stored and recorded as a portion of the security data. Thus, the position of the transport container 14 is monitored before, during, and after the transport operation, and subsequently matched with the predetermined route the transport container 14 was expected to take, to ensure that no unauthorized deviations were taken from that route.

Added to the security features of the security monitoring system 10 described herein is a record keeping feature which provides significant benefits to entities associated with production, transport, processing, and marketing of foodstuffs. Again using the dairy industry for purposes of example, milk data is entered into the handheld user interface device 36 at the dairy farm, such as dairy farm milk pick-up information including date, time, milk temperature, bulk milk hauler/sampler identification, milk gauge reading and weight of the milk, quality evaluation, milk marketing agency dairy farm identification number, farm bulk tank identification, and milk transport container 14 identification. The milk data are stored on the handheld user interface device 36 for a predetermined period of time, such as at least 30 days.

Discrete milk samples are collected also for subsequent analysis, labeled and placed in the sampling container 32. The milk sample label contains a unique identifier 44 (barcode) and other information identifying the sample. The sample data are stored in memory by the handheld user interface device 36 as part of the milk data. Similarly, herd data, such as particular cow identification numbers, time of milking, and pounds of milk produced since the prior milk pickup may be received from a dairy farm computer by wireless or other communication means, manually entered into the handheld user interface device, and stored in memory.

Security data as described in detail above are recorded and stored in memory at predetermined time intervals and/or upon occurrence of particular events by the handheld user interface device 36 also. Such data include change in electromechanical locking mechanism 20 status, bulk milk hauler/sampler unique identifier 44 and/or transport vehicle operator unique identifier 44, GPS data, reason codes for accessing the transport container 14, transport container 14 temperature, sampling container 32 temperature, and the like. Typically, security data are recorded as a discrete security session which begins at the most recent moment after unloading of a milk transport container 14 is completed, or at the beginning of a milk transport container 14 wash/sanitizing cycle. Wash cycle data are included with the first security session data for a load of milk after a wash/sanitizing cycle, but not subsequent milk loads added to the transport container 14 where no wash cycle occurs between loads. A security session typically incorporates data associated only with a particular load of milk delivered to a milk plant.

The security data and milk data as described above are typically combined into a security session data file which remains in memory on the transport container's 14 controller 26 primary processor. The security session data file may be transmitted to the remote data processor 46 at predetermined intervals, or upon occurrence of one or more predetermined events, such as completion of loading of milk at a dairy farm, after unloading milk at a receiving station, transfer station, milk plant, or wash station, etc. As a redundant security feature, the security data stored on the controller 26 are transmitted to the handheld user interface device 36 at predetermined intervals. Still further, security session data are transferred to the remote data processor 46 at predetermined intervals. The data may be transmitted directly from the controller 26 primary processor, such as by cellular communication, or may be transmitted from the handheld user interface device 36. Such transmission is preferably wireless, such as by cellular signal, RF signal, wi-fi, general packet radio service (GPRS), global system for mobile communications (GSM), integrated digital enhanced network (IDSN), and the like, although non-wireless transmission is contemplated also (facsimile, telephone, Internet transmission via telephone lines, etc.).

Typically, security session data will be transmitted to the remote data processor 46 at suitably short polling intervals, such as for example every 1 to 20 minutes. The skilled artisan will immediately appreciate the enhanced record keeping and security structure provided by this feature. That is, the security monitoring system 10 as described herein significantly improves the accuracy and speed with which pertinent records can be accessed and evaluated, such as for trace-back, allowing near real time monitoring of security and milk data by personnel during a transport operation. In this fashion, food safety and security are significantly enhanced in comparison to conventional security practices for transport of bulk foodstuffs.

The remote data processor 46, which may be located at a milk plant or other central location, receives all data relating to security session data files, all attribute data for bulk milk haulers/samplers, vehicle operators, transport vehicles 12, transport containers 14, farm bulk tanks 40, dairy farms contributing to a particular milk load, receiving stations receiving that load, milk plants receiving that load, transportation companies transporting that load, and milk marketing agencies with which one or more of the dairy farm/milk plant/transportation company are associated. Thus, all data relating to every aspect of milk production, quality, transport, security, and the like are centrally located for further analyses.

Such analyses may include analysis of security session data to verify secure transport of the milk, for example to verify that: authorized personnel accessing the milk transport tank have or have maintained up-to-date credentials; all locations traveled by the milk transport container 14 were appropriate for the dairy farm, receiving station and milk plant serviced, that is, that the transport container 14 did not deviate from its planned route; that access time events were within expectations, that is, that the electromechanical locking system 20 was opened only at expected times and locations and only for an appropriate length of time to complete the authorized task; that the positional locator 28 (GPS) data are consistent with the route and locations serviced; and that the inputted reasons codes for accessing the transport container 14 were correct. Other analyses of value allowed by the present security monitoring system include; verification that the milk was obtained from an approved source; that the milk was transported in an approved and recently inspected milk transport container 14; and that the milk transport container 14 was washed and sanitized at an authorized location within a predetermined time period prior to taking on a load of milk (as an example, typical practice in the dairy industry is to require washing/sanitation of a milk tanker no more than 96 hr prior to loading) and under the appropriate thermal conditions.

It will be appreciated by the skilled artisan that the enhanced security and record keeping structure provided by the security monitoring method and system described herein will improve the accuracy and speed with which pertinent foodstuff records may be accessed and evaluated for trace-back, enhancing food safety and security. The tangible benefits of such improved security and recordkeeping will be clearly recognized, such as allowing rapid trace-back of a particular load of a foodstuff after an outbreak of a food-related illness, after a security breach, or after a real or false allegation of such an outbreak or breach. The detection of information that might be incomplete or erroneous and the size of the security "event" will be reduced, hoaxes more readily identified, and the cost of security events held in check. These benefits will flow through to consumers, producers, foodstuff transporters, foodstuff marketing agencies, and foodstuff processors.

The robust security monitoring system described herein, including the improved record keeping aspect, will provide the opportunity for rapid and thorough investigation of security breaches. Industry and governmental agencies will thus be able to take more rapid and targeted action, reducing the scope and scale of any potential contamination or security breach, or alternatively detecting hoaxes more readily. Costs associated with foodstuff security breaches or product contamination, or with hoaxes related thereto, will be reduced by such rapid, targeted action. Even more, consumer confidence in the safety of the food supply will be improved by the enhanced security and recordkeeping afforded by the present system and methods.

The foregoing description of preferred embodiments has been presented for purposes of illustration and description. It is not intended to be exhaustive or limiting to the invention to the precise forms disclosed. Obvious modifications or variations are possible in light of the above teachings. The embodiments were chosen and described to provide the best illustration of the principles described herein and their practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for monitoring and securing a bulk foodstuff during transport in a bulk foodstuff transport container having at least one lockable access port provided with an electromechanical locking mechanism, comprising:

assigning a unique identifier to the bulk foodstuff transport container, to any storage container from which a bulk foodstuff is transferred to the bulk foodstuff transport container, to any storage container into which a bulk foodstuff is transferred from the bulk foodstuff transport container, and to any individual authorized to access an interior of the bulk foodstuff transport container;

automatically recording any status change in the electromechanical locking mechanism;

if such status change is effected by an authorized individual, requiring inputting the individual's unique identifier and the reason for that status change prior to allowing such status change; and automatically recording a geographical position of the bulk foodstuff transport container at predetermined intervals.

2. The method of claim 1, further including assigning a unique identifier to a transport vehicle for transporting the bulk foodstuff transport container and automatically recording that identifier at least when the bulk foodstuff transport container is associated with or disassociated from that transport vehicle.

3. The method of claim 2, further including assigning a unique identifier to any authorized operator of the transport vehicle, and automatically recording that unique identifier whenever an authorized operator accesses that transport vehicle.

4. The method of claim 3, further including automatically recording a temperature of an interior of the bulk foodstuff transport container at predetermined intervals.

5. The method of claim 4, further including automatically recording a temperature of a portion of the bulk foodstuff transferred into a separate sampling container associated with the bulk foodstuff transport container.

6. The method of claim 5, further including providing a controller associated with the bulk foodstuff transport container, said controller being configured to process and store data representative of said unique identifiers, said electromechanical locking mechanism status, said geographical position, and said temperature;

further including configuring said controller to control a status of the electromechanical locking mechanism and to automatically record any status change in the electromechanical locking mechanism.

7. The method of claim 6, further including providing a handheld user interface device configured to retrieve said data from said controller and to read said unique identifiers provided for the bulk foodstuff transport container and the transport vehicle.

8. The method of claim 6, further including configuring the controller to communicate with a remote data processor in near real time.

9. The method of claim 7, including configuring said handheld user interface device to transfer said data to a remote data processor in near real time.

* * * * *